Patented Aug. 25, 1953

2,650,217

UNITED STATES PATENT OFFICE 2,650,217

PRODUCTION OF QUININE-PENICILLIN

Thomas J. Macek, Irvington, N. J., assignor to Merck & Co., Inc., Rahway, N. J., a corporation of New Jersey No Drawing. Application August 24, 1950, Serial No. 181,313

2 Claims. (Cl. 260—239.1)

This invention relates to repository or depot penicillin compositions. More particularly, it relates to a new and improved formulation of quinine penicillin which is especially suitable for parenteral administration.

While repository or depot penicillin compositions, such as procaine penicillin, have been recently developed, and have gone into widespread use, for some purposes procaine penicillin is not entirely suitable. As a result attention has been directed to other salts of penicillin having a low solubility in aqueous solutions, such as quinine penicillin. While quinine penicillin has been utilized to a certain limited extent, its use has been greatly hindered by the excessive bulk (i. e., volume occupied by unit weight), of the crystalline compound.

When the quinine salt of penicillin has been used in the preparation of an aqueous suspension thereof intended for parenteral administration by the addition of water to an amount of the quinine penicillin salt sufficient to give the desired therapeutic activity, the procedure, in practically all cases, has resulted in a suspension having little or no fluidity. That non-fluid suspensions of this character are obtained is probably due, in part, to the very high bulk of the crystalline quinine penicillin salt. The resulting suspensions have been of little or no use therapeutically, as it has been almost impossible for physicians to administer them parenterally to patients. The non-fluid suspensions prepared by admixing quinine penicillin of ordinary high bulk and water are not capable of being drawn into or forced out of the conventional hypodermic needle.

It is, therefore, the primary object of this invention to provide new and improved quinine penicillin formulations suitable for parenteral administration by injection, which formulations have a sufficiently high degree of fluidity to permit their passage through a hypodermic syringe of conventional design.

It is another object of this invention to provide new and improved quinine penicillin formulations of suitable fluidity for parenteral use, capable of being administered through ordinary hypodermic needles, which formulations contain, in addition to quinine penicillin, various additional materials and agents which impart to the resulting formulation an increased degree of fluidity.

It is a further object of this invention to provide quinine penicillin of very much lower bulk, which quinine penicillin, when incorporated in an aqueous suspension by the addition of water thereto sufficient to yield a penicillin formulation having the desired therapeutic activity, will result in a composition suitable for parenteral injection of a very much increased degree of fluidity, which therapeutic suspension can be drawn into and forced out of the conventional hypodermic syringe.

Still another object of this invention is the provision of a new and improved method for lowering the bulk of quinine penicillin to an extent such that, when the quinine penicillin is made up into an aqueous suspension to yield a therapeutic formulation thereof, the resulting formulation is of such lowered fluidity that it may be readily employed for hypodermic injection.

A still further object of this invention is the provision of a solvent treatment for crystalline quinine penicillin of ordinary bulk, which solvent treatment, when applied to the usual quinine penicillin product, results in a quinine penicillin salt of greately reduced bulk.

An additional object of this invention is to provide new and improved quinine penicillin preparations of sufficient fluidity to permit their effective use parenterally by injection through a hypodermic syringe, which preparations contain my new and improved quinine penicillin of lowered bulk, prepared as herein described, as well as certain additional or auxiliary agents and/or suspending agents which still further increase the fluidity characteristics of the formulation.

These, and still further objects of this invention, will be apparent from the ensuing disclosure of certain preferred embodiments thereof. It should be understood that these preferred embodiments are given by way of illustration only, as various changes and modifications may be made which would nevertheless result in compositions utilizing and exhibiting all the essential characteristics of my invention.

In carrying out my invention, the active therapeutic agent, quinine penicillin, is prepared by reacting quinine and penicillin, preferably in an aqueous reaction medium, or by reacting a salt of penicillin, preferably an alkali metal salt such as sodium penicillin, with quinine or a salt of quinine such as quinine hydrochloride. The preparation of quinine penicillin, as such, is no part of my invention, as I prefer to start with the crystalline quinine penicillin salt which has been prepared by the above-described, or by some other procedure, well known in the art, which will result in this product.

The crystalline quinine salt of penicillin so prepared, can be sterilized, and is capable of being utilized in pharmaceutical formulations. However, since its bulk is ordinarily equivalent to at least 10 milliliters per gram of quinine salt, or greater, it cannot be employed successfully for quinine penicillin formulations which are intended for passage through a hypodermic syringe or hypodermic needle of conventional design.

The fluidity properties of suspensions in water or aqueous fluids of the crystalline salt, quinine penicillin, as customarily prepared, can therefore be improved, in accordance with my invention, by the addition of certain electrolytes and/or salts as auxiliary agents to the aqueous suspensions.

Among these agents, electrolytes or salts, added as auxiliary agents, I prefer to incorporate trisodium citrate, preferably the anhydrous salt. In addition to trisodium citrate, I also prefer to incorporate one or more of the alkali metal salts of penicillin, such as sodium penicillin or potassium penicillin. Another agent which may be added to aqueous suspensions of quinine penicillin of usual bulk in order to improve the fluidity characteristics are metal derivatives of organic cellulose compounds, such as the alkali metal carboxymethyl celluloses, more particularly sodium carboxymethyl cellulose.

These agents may be incorporated in aqueous suspensions of quinine penicillin either individually, or in various combinations thereof. Frequently sufficient fluidity is imparted to such aqueous suspensions to permit drawing the resulting therapeutic formulations into and out of hypodermic needles of conventional design merely by the addition of trisodium citrate alone, but ordinarily in order to secure the best fluidity characteristics for the formulation, I prefer to have either an alkali metal penicillin present, or an alkali metal carboxymethyl cellulose (preferably anhydrous), or both, in addition to trisodium citrate.

While trisodium citrate has previously been used as an addition agent in the formulation of procaine penicillin preparations, it was not to be expected that with quinine penicillin the use of additional quantities of trisodium citrate would favorably affect the fluidity characteristics of aqueous suspensions of quinine penicillin. Moreover, it was totally unexpected that such a relatively small increase in the fluidity characteristics of procaine penicillin suspensions would render the resulting formulations satisfactory for parenteral administration.

While the addition of the agents imparting fluidity to the aqueous suspension of quinine penicillin will frequently permit the use of ordinary crystalline quinine penicillin in penicillin preparations intended for parenteral administration, permitting their injection through a hypodermic needle, ordinarily it is preferred to utilize in preparing such formulations a crystalline quinine penicillin of lowered bulk. In preparing this crystalline quinine penicillin of lowered bulk I have found it advantageous to prepare a slurry of ordinary quinine penicillin, using as the slurrying agent either an organic solvent in which quinine penicillin is insoluble, or a solvent pair which comprises one organic solvent in which quinine penicillin is soluble and a second organic solvent in which quinine penicillin is insoluble, there being sufficient of the last-named solvent present to maintain the quinine penicillin treated in the crystalline state.

In preparing quinine penicillin of lowered bulk, it is ordinarily preferred to slurry the penicillin salt with an organic solvent such as diethyl ether, or with mixed organic solvents such as a solvent pair comprising a mixture of methanol and benzene. After the slurry has been prepared the quinine penicillin is filtered off or collected by centrifugation. It is dried under vacuum and sieved to remove coarse agglomerates. An improved quinine penicillin salt of greatly reduced bulk is thus secured. It may be utilized either directly, or in combination with other agents, for the preparation of formulations intended for parenteral administration.

While we have found that treatment of quinine penicillin, by slurrying with an organic solvent, followed by recovery of the treated solid product and sieving to remove coarse agglomerates, will result in a quinine penicillin of lowered bulk, especially if an organic solvent such as diethyl ether, or a solvent mixture such as a mixture of methanol and benzene is utilized, the exact mechanism of the procedure is not understood. It has been postulated that the solvent treatment may remove air which is adsorbed or otherwise retained on the individual, finely-divided particles of quinine penicillin, or the treatment may serve to alter the electrostatic charge or charges on the particles of the penicillin salt. But the exact mechanism has not, as yet, been explained. It has been repeatedly demonstrated, however, that the slurrying treatment of quinine penicillin with an organic solvent of the character specified will reduce the bulk to the desired degree without, however, changing the crystalline structure of the quinine penicillin or adversely affecting its desirable therapeutic properties.

It has been found that when the quinine penicillin of lowered bulk, prepared as hereinabove described, is mixed with a suitable aqueous vehicle to obtain formulations intended for parenteral administration, as long as the material of lowered bulk is used, the resulting suspension is capable of being drawn into and forced out of a hypodermic needle of the ordinary type. This is a great improvement over formulations prepared by using quinine penicillin of the usual high bulk, which formulations do not possess satisfactory fluidity characteristics such as are necessary to permit their passage through hypodermic syringes.

For best results, however, it has been found desirable not only to make up the formulations intended for parenteral use using the improved quinine penicillin of lowered bulk, but also to incorporate in the aqueous suspension one or more of the additives previously enumerated. In this way formulations having the very best fluidity characteristics are obtained, and these formulations are of outstanding superiority for parenteral administration.

It is therefore preferred, in making up aqueous preparations for parenteral administration, to incorporate in the quinine penicillin of lowered bulk, one or more of the additives previously specified, i. e., trisodium citrate (preferably anhydrous); an alkali metal penicillin, preferably sodium or potassium penicillin; and/or an alkali metal organic cellulose derivative such as sodium carboxymethyl cellulose. Of these agents trisodium citrate is preferred when used alone with the quinine penicillin of lowered bulk, but ordinarily I prefer to introduce two of the three specific types of additives, or all three of the specified slurrying agents, in making up quinine penicillin formulations having the very best fluidity characteristics, i. e., fluidity characteristics which render them capable of being injected to yield therapeutic blood levels of penicillin of uniform and prolonged action.

As examples of new and improved formulations of quinine penicillin, as prepared in accordance with my invention, the following may be given:

Example 1

A quinine penicillin formulation was prepared containing the following amounts of the specified ingredients, all these ingredients being sterile:

| | Grams per vial |
|---|---|
| Quinine penicillin, microfine | 2.400 |
| Penicillin G potassium | 0.425 |
| Trisodium citrate anhydrous | 0.600 |
| Sodium carboxymethyl cellulose, anhydrous | 0.050 |
| | 3.475 |

The combination was mixed by tumbling, and then aseptically subdivided into sterile vials each containing 3.475 grams. The addition of 4 milliliters of sterile distilled water to the contents of the vial, with shaking, produced approximately 6 milliliters of an aqueous suspension containing 300,000 units of quinine penicillin and 100,000 units of potassium penicillin per milliliter. The aqueous suspension was fluid, and was easily syringeable through a 20-gauge hypodermic needle.

Example 2

A quinine penicillin formulation was prepared in accordance with the following procedure:

The quinine penicillin was first treated in order to reduce its bulk. This was done by stirring 134 grams of microfine sterile quinine penicillin with 108 milliliters of a sterile mixture which comprised one part methanol and three parts of benzene. This slurry was diluted by the addition thereto of 491 milliliters of sterile benzene, whereupon it was filtered through a sintered glass filter.

The quinine penicillin filter cake was then dried under reduced pressure, less than atmospheric, under aseptic conditions. The product was then sifted through an 80-mesh screen in order to remove agglomerates. The resulting quinine penicillin product had a bulk corresponding to only 4.60 milliliters per gram, while the quinine penicillin of ordinary type, utilized as starting material, had a bulk of 18.00 milliliters per gram.

It is thus evident that the bulk was greatly reduced, to appoximately one-fourth of its original value. This means that one gram of the product of lower bulk occupied much less space than one gram of conventional crystalline quinins penicillin product which had been utilized as the starting material in the process of preparing the improved product of greatly improved bulk characteristics.

The quinine penicillin of lowered bulk, thus prepared, was mixed with the following ingredients in the indicated proportions:

| | Grams per vial |
|---|---|
| Quinine penicillin | 2.450 |
| Penicillin G potassium | 0.425 |
| Trisodium citrate, anhydrous | 0.133 |
| | 3.008 |

The weighed, sterile ingredients, in indicated proportions were thoroughly mixed by tumbling, and the mixture was then aseptically subdivided into sterile vials, each of which contained 3.008 grams. The addition of 4 milliliters of sterile distilled water to the contents of each vial produced approximately 6 milliliters of aqueous suspension. The water and quinine penicillin were thoroughly shaken in order to secure complete dispersion of the penicillin salt throughout the liquid. The aqueous suspension contained substantially 300,000 units of quinine penicillin and 100,000 units of potassium penicillin per milliliter. The therapeutic formulation thus obtained could be easily passed through a hypodermic syringe using the conventional hypodermic needle of 20-gauge.

Example 3

A slurry was prepared containing 300 grams of sterile quinine penicillin (microfine) and about 1,000 milliliters of sterile diethyl ether. After agitation the slurry was filtered through a sintered glass filter. The filter cake of quinine penicillin was then aseptically dried under a reduced pressure, less than atmospheric, and sifted through a screen of 80-mesh in order to remove agglomerates from the powder. The resulting powder of fine particle size had a bulk of 4.40 milliliters per gram, as compared with a bulk of 18.00 milliliters per gram for the starting material.

This quinine penicillin of lowered bulk was then made up into therapeutic preparations, suitable for parenteral administration, by admixture with the following ingredients in the proportions specified:

| | Grams per vial | Grams per batch |
|---|---|---|
| Quinine penicillin | 2.20 | 132.0 |
| Penicillin G potassium | 0.42 | 25.2 |
| Trisodium citrate anhydrous | 0.43 | 25.8 |
| | 3.05 | 183.0 |

The formulations were prepared by aseptically mixing the weighed, sterile ingredients by tumbling, and then subdividing the mixture into sterile vials, each vial containing 3.05 grams. The addition of 4 milliliters of sterile distilled water to the contents of each vial, followed by agitation, resulted in approximately 6 milliliters of an equeous suspension of quinine penicillin. The suspension contained 300,000 units of quinine penicillin and 100,000 units of potassium penicillin per milliliter. The formulation was easily syringeable through a standard 20-gauge hypodermic needle.

It should be understood that various changes and modifications may be made in the procedures, proportions and amounts as herein given as illustrative of preferred embodiments of my invention. Such variations and modifications as are within the scope of the appended claims are to be regarded as part of my invention.

I claim:
1. The process of producing quinine penicillin of lowered bulk which comprises slurrying crystalline quinine penicillin with diethyl ether.
2. The process of producing quinine penicillin of lowered bulk which comprises slurrying crystalline quinine penicillin with diethyl ether, and separating a product of lowered bulk from said diethyl ether.

THOMAS J. MACEK.

(References on following page)

References Cited in the file of this patent

UNITED STATES PATENTS

| Number | Name | Date |
|---|---|---|
| 2,438,106 | Alburn | Mar. 23, 1948 |
| 2,515,898 | Rhodehamel | July 18, 1950 |

OTHER REFERENCES

Bi-Pen, J. A. P. A., Practical Pharm. Ed., May 1949, p. 269.

Pen-Aqua, J. A. P. A., Practical Pharmacy Ed., June 1949, p. 330.

Monasch, "Science" vol. 107, October 17, 1947, p. 370.

Merck Report CMR-M-XV-b March 31, 1944 (pub. 1947) page 1.

Abraham et al., "Bri. J. Exp. Path.," vol. 23, June 1942, p. 108.

Detouches et al., "Comptes Rendus Acad. Sci.," vol. 228, June 27, 1949, pp. 2066–2068.

Neuroth et al., "Penicillin Ointments . . ." Amer. Jour. Pharm., October 1946, pp. 363, 364.

Lesser, "Cellulose Derivatives," Drug and Cosmetic Ind., June 1948, pp. 750–752, and 830–832, p. 752 esp. pertinent.

Penicillin S–R, J. A. P. A., Practical Pharmacy Ed., March 1949, p. 179.